US00RE34645E

United States Patent [19]

Rooney

[11] E Patent Number: Re. 34,645

[45] Reissued Date of Patent: Jun. 28, 1994

[54] PAPER TAIL CUTTER

[75] Inventor: Sidney C. Rooney, New Westminster, Canada

[73] Assignee: Fibron Machine Corporation, New Westminster, Canada

[21] Appl. No.: 815,053

[22] Filed: Dec. 24, 1991

Related U.S. Patent Documents

Reissue of:

[64] Patent No.: 4,671,151
Issued: Jun. 9, 1987
Appl. No.: 809,062
Filed: Dec. 13, 1985

[51] Int. Cl.[5] ..... B26D 5/12

[52] U.S. Cl. ..... 83/150; 83/373; 83/566; 83/611

[58] Field of Search ..... 83/106, 150, 373, 566, 83/611, 610, 408; 242/56.6, 56.5

[56] References Cited

U.S. PATENT DOCUMENTS

| | | | |
|---|---|---|---|
| 253,967 | 2/1882 | Binns | 83/262 |
| 755,696 | 3/1904 | Prankard, Jr. | 83/529 |
| 1,098,510 | 2/1914 | Krauth | 83/275 |
| 1,195,517 | 8/1916 | Sielaff | 83/566 X |
| 1,262,189 | 4/1918 | Froehlich | 83/373 X |
| 1,424,175 | 1/1922 | Morse | 83/611 |
| 3,977,280 | 8/1976 | Mundt et al. | 83/373 X |
| 4,389,868 | 6/1983 | Strout | 83/150 X |

FOREIGN PATENT DOCUMENTS

| | | | |
|---|---|---|---|
| 153391 | 11/1920 | United Kingdom | 83/611 |

*Primary Examiner*—Eugenia Jones
*Attorney, Agent, or Firm*—Oyen, Wiggs, Green & Mutala

[57] ABSTRACT

A paper tail cutter for cutting *a leading edge upon* and deflecting a tail from a moving sheet of paper. A cutter body member is pivotally mounted to swing a knife up through the *path of* the moving sheet of paper, [thereby cutting] *to engage* a narrow, *previously severed,* tail at one side of the moving sheet. The tail is supported by the body member and deflected away from the moving paper sheet *as the leading edge is simultaneously cut thereon* for delivery to apparatus such as a stack of calender rolls.

7 Claims, 6 Drawing Sheets

PAPER TAIL CUTTER

Matter enclosed in heavy brackets [ ] appears in the original patent but forms no part of this reissue specification; matter printed in italics indicates the additions made by reissue.

FIELD OF THE INVENTION

This application pertains to a paper tail cutter for cutting *a leading edge upon* and deflecting a tail from a moving sheet of paper.

BACKGROUND OF THE INVENTION

At one stage of a typical paper making operation a moving, continuous sheet of paper is passed, at high speed, over a plurality of dryer rolls and then through a stack of calender rolls which "calender" the paper by imparting the desired smooth finish thereto. Since it is difficult to guide the full width of the moving paper sheet off the last dryer roll and then feed it through the calender stack, a narrow "tail" is cut to one side of the moving sheet as it comes off the last dryer roll, the balance of the moving sheet being allowed to fall into a broke pit for reprocessing. The tail can be somewhat more easily fed through the calender stack and then used to draw the full width of the paper sheet through the calender stack.

In the prior art, a tail is typically cut in lightweight paper by directing a blast of compressed air at the moving paper sheet. This however produces a torn, ragged edge which can be difficult to pass through the infeed nips of the calender roll stack. Paper tails are typically produced in medium or heavier-weight paper sheets by hand-tearing which is dangerous procedure that has resulted in serious operator injuries.

The poorly cut paper tails produced by prior art methods are not only difficult to feed through the calender stack infeed nips, but also often overlap upon themselves. This poses serious problems because an overlapped tail may cause "roll bounce" when material of dual or greater thickness passes between the calender rolls. Over time, roll bounce may cause "barring", a form of marking of the calender rolls, which may eventually require expensive, time-consuming resurfacing of the rolls and consequential downtime of the paper making equipment.

A further disadvantage of the prior art is that the operating speed of the paper making equipment usually must be reduced while the tail is cut and transferred to the calender stack.

The present invention provides a paper tail cutter which cleanly cuts *a smooth leading edge on* a tail from a moving sheet of paper and delivers the tail, at the full operating speed of the paper making equipment, to tail transfer equipment which guides the tail into the calender stack infeed nips, thereby vastly simplifying the tail handling and threading procedure and overcoming the foregoing difficulties by reducing equipment downtime and labour costs, while minimizing the potential for operator injuries.

SUMMARY OF THE INVENTION

In accordance with a preferred embodiment the invention provides a paper tail cutter for cutting *a smooth leading edge on a paper tail* and deflecting [a] *the* moving paper tail from a moving sheet of paper. The paper tail cutter comprises a body member for supporting the moving paper tail. The body member is pivotally mounted, at one end, so that its opposed end, at which a first knife is mounted, may swing through the plane traversed by the moving paper sheet. A second knife is fixed, with respect to the first knife, to provide a scissor-like cutting action between the knives when the body member pivots to swing the first knife across the second knife. More particularly, pivotal movement of the body member and the first knife relative to the moving paper sheet [cuts a portion of the moving paper sheet to yield a moving paper tail. Continued pivotal movement of the body member] deflects the moving paper tail away from the moving paper sheet *and cuts a smooth leading edge on the tail as the first knife swings across the second knife.*

Advantageously, the body member has a troughed surface ion retaining and guiding the paper tail.

Powered means are provided for pivoting the body member to force the first knife across the second knife. Preferably, the knives have edges which are contoured to cut a shaped end of the paper tail, thereby easing machine handling of the tail. In a particularly preferred embodiment, the knife edges are contoured to cut a "V"-shaped end of the paper tail.

The body member is normally retracted to a position beneath the moving paper sheet, whereas the second knife is fixed in position above the moving sheet. Accordingly, operation of the powdered means pivots the body member into the [sheet] *tail* thus deflecting the paper tail [, once cut,] away from the moving sheet of paper.

A "U"-shaped frame having a first leg for pivotally supporting the pivotable end of the body member, and having a second, opposed leg for supporting the second knife may advantageously be used to provide a unitary support structure for the paper tail cutter, while facilitating retraction of the body member as aforesaid.

DETAILED DESCRIPTION OF THE PREFERRED EMBODIMENT

Figure 1:
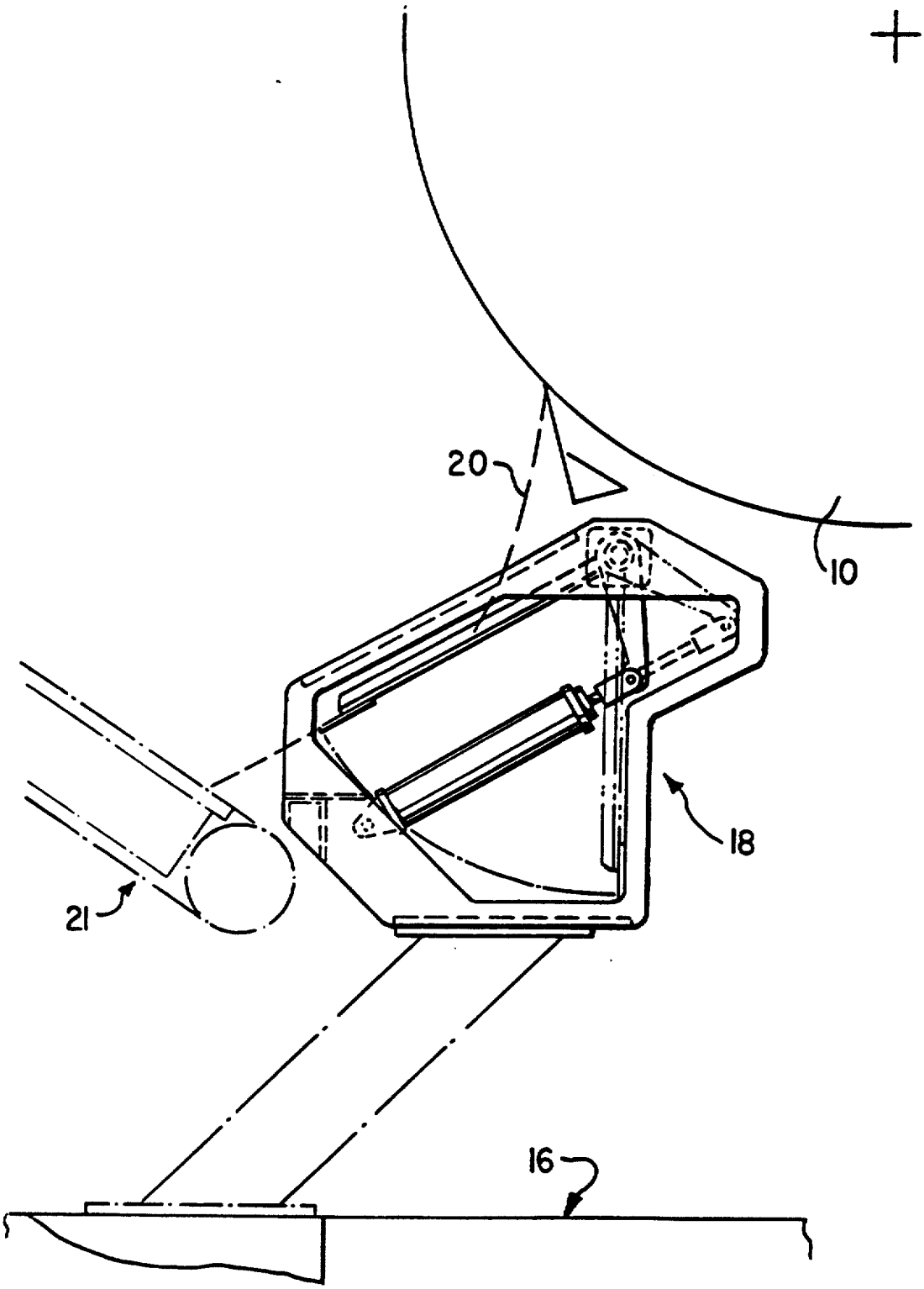
FIG. 1 is a side elevation view which illustrates how the paper tail cutter of the preferred embodiment may be positioned, relative to a dryer roll, to cut a paper tail [in a moving sheet of paper] and deliver the cut tail to a conveyor assembly.

FIG. 1 illustrates schematically a dryer roll 10 which may be the last of a series of dryer rolls over which a moving, continuous sheet of paper 12 is passed at high speed. The end of the moving sheet 12 must somehow be conveyed to a calender roll stack (not shown, but off to the left of the apparatus shown in FIG. 1) and threaded through the calender stack, which then imparts the desired finish to the paper before it is passed on for further processing by additional apparatus (also not shown). Since it would be extremely difficult to thread the full width of moving paper sheet 12 through the calender stack, a narrow tail *20* is cut to one side of sheet [12] *by conventional means* (*not shown*). This tail is more easily handled and threaded through the calender stack and is then used to draw the full width of sheet 12 through the calender stack. More particularly, paper tail cutter 19 (best seen in FIG. 2, but also illustrated in FIGS. 3 and 4) cuts [a] *the* narrow tail 20 to [one side of sheet 12] *form a smooth leading edge thereon* and deflects tail 20 away from the balance of sheet 12 to conveyor apparatus 21 which in turn delivers tail 20 to the calender stack. [The balance of sheet 12 falls into broke pit 16 for reprocessing.]

Paper tail cutter 18 comprises a body member 24 which is pivotally mounted, at end 26, on axle 28 which is in turn rotatably mounted in the upper or "first" leg 27 of rigid U-shaped frame 29. This mounting enables body member 24 to swing about axle 28 up through the plane traversed by moving paper sheet 12 as the sheet falls into broke pit 16. This swinging action carries the opposed end 30 of body member 24, to which first knife 32 is affixed into [sheet 12] *tail 20* thus forcing [sheet 12] *tail 20* up towards second knife 34, which is fixed in the lower or "second" leg 36 of frame 29. The desired swinging action is provided by a powered means such as compressed air cylinder 38 which is coupled between frame 29 and body member 24 to pivot body member 24 as aforesaid and force first knife 32 and moving [sheet 12] *tail 20* across second knife 34. Since second knife 34 is fixed with respect to first knife 32, a scissor-like cutting action occurs between the knives, thus cleanly severing [a portion of sheet 12 to yield] tail 20 [which is then] *to form a clean leading edge thereon, the tail 20 being* supported on the surface 40 of body member 24. Surface 40 is a smooth steel plate.

Tail 20 slides off end 30 of body member 24 and may then be transferred to conveyor apparatus 21 (preferably a vacuum tail transfer unit) or to other suitable means for conveying tail 20 to the calender stack and for threading tail 20 through the calender stack. Advantageously, surface 40 is troughed, for example by providing it with raised side 42 to retain and guide tail 20 on and over surface 40. Preferably, surface 40 is appreciably wider than tail 20 to further assist accurate guidance of tail 20 over surface 40.

The edges of knives 32, 34 are preferably contoured to cut a shaped end on tail 20, thereby further easing machine handling of tail 20. More particularly, the knife edges are preferably contoured to provide a shallow "V"-shaped point on the end of tail 20 which can more easily be fed through the infeed nips of the calender stack. Advantageously, knives 32, 34 are removably and adjustably affixed to body member 24 and leg 36 respectively. This facilitates rapid removal of dulled knives and replacement thereof with sharpened knives. Adjustment of knives 32, 34 relative to one another to yield a clean, even cut is accomplished by proving a plurality of slotted apertures (not shown) in each of knives 32, 34 through which recessed hold-down screws (which may be back set) are fastened to hold the knives against body member 24 and leg 36 respectively.

Figure 2:
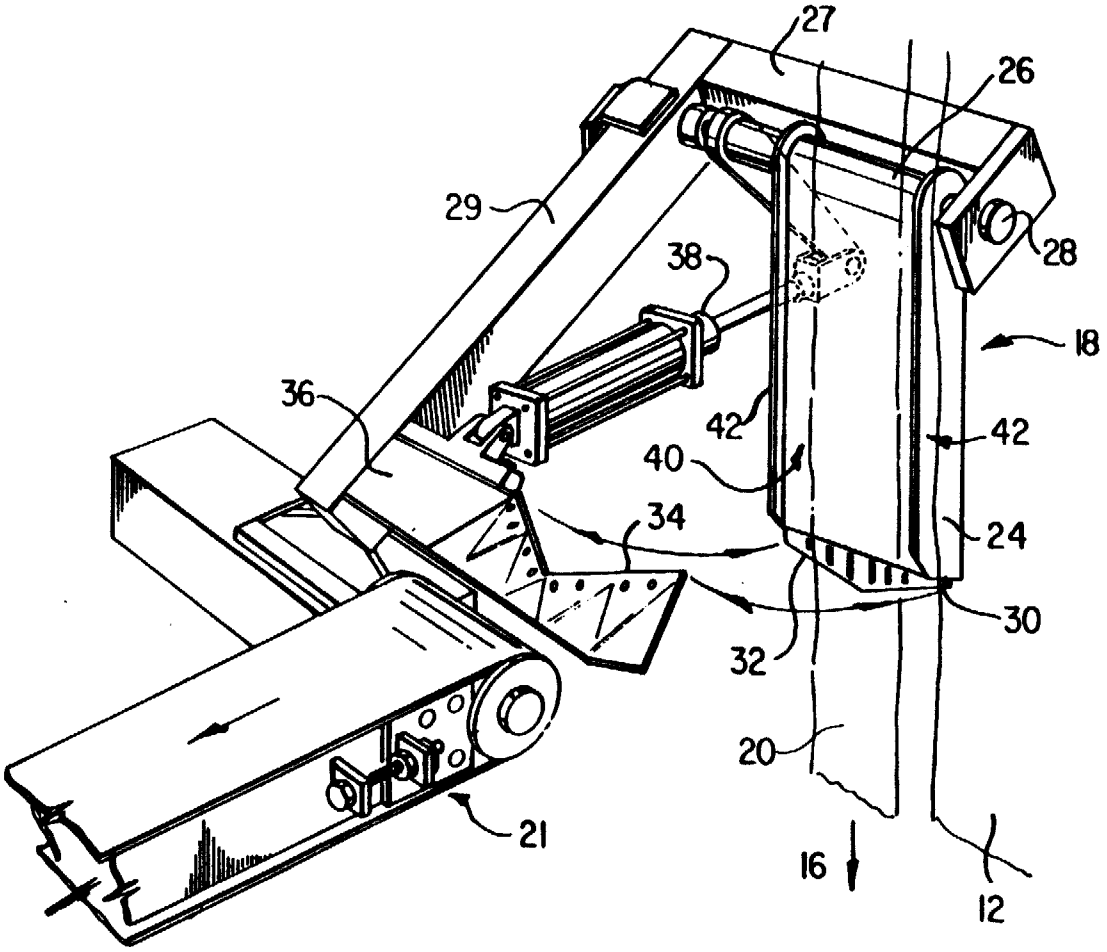
FIG. 2 is a perspective view of the paper tail cutter of FIG. 1, as viewed from the front left side.

To avoid obscuring details of the invention FIG. 2 shows paper tail cutter 18 in its retracted position beneath moving [paper sheet 12] *tail 20*. Accordingly, both tail 20 and the balance of sheet 12 are shown falling towards broke pit 16. In practice however, the swinging action of body member 24 deflects tail 20 away from sheet 12 towards conveyor apparatus 21 which, once tail 20 has been cut, draws tail 20 across its surface, away from the balance of paper sheet 12, for eventual threading through the calender stack. After tail 20 has been cut and guided onto conveyor apparatus 21, paper tail cutter 18 may be retracted to the position shown in FIG. 2 so that it does not interfere with movement of paper sheet 12 when the full sheet is drawn through the calender stack.

Figure 3:
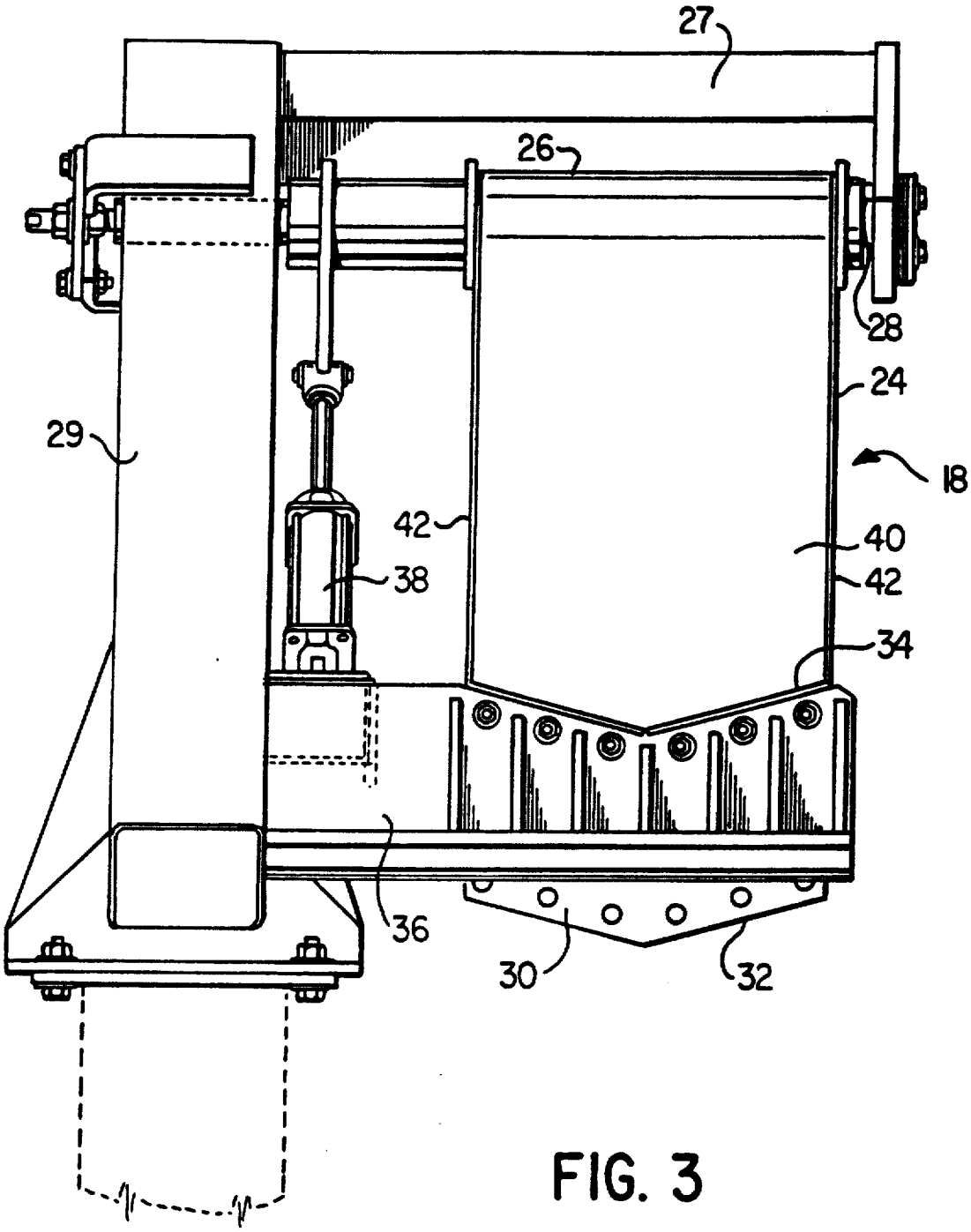
FIG. 3 is a front view of the paper tail cutter of FIG. 2.
Figure 4:
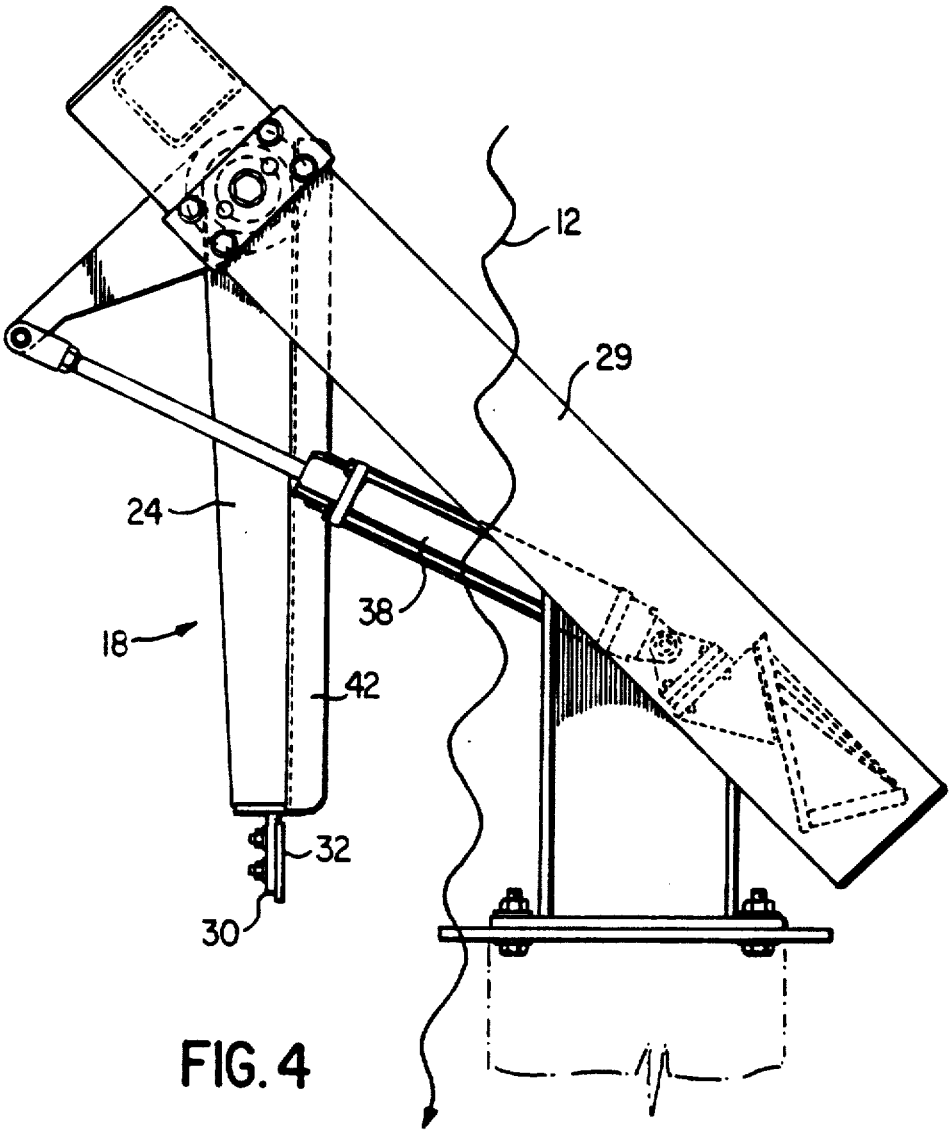
FIG. 4 is a left side view of the paper tail cutter of FIGS. 2 and 3.
Figure 5:
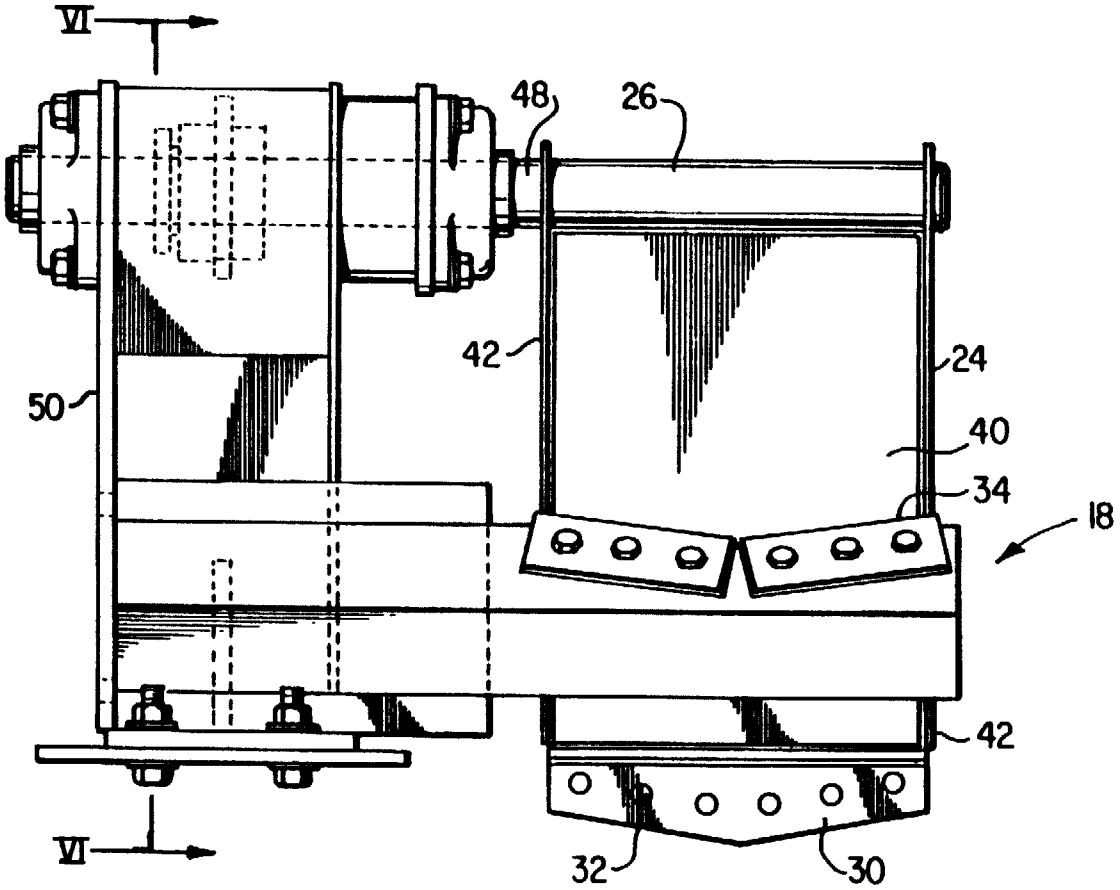
FIG. 5 is a front view of an alternate embodiment of a paper tail cutter according to the invention.
Figure 6:
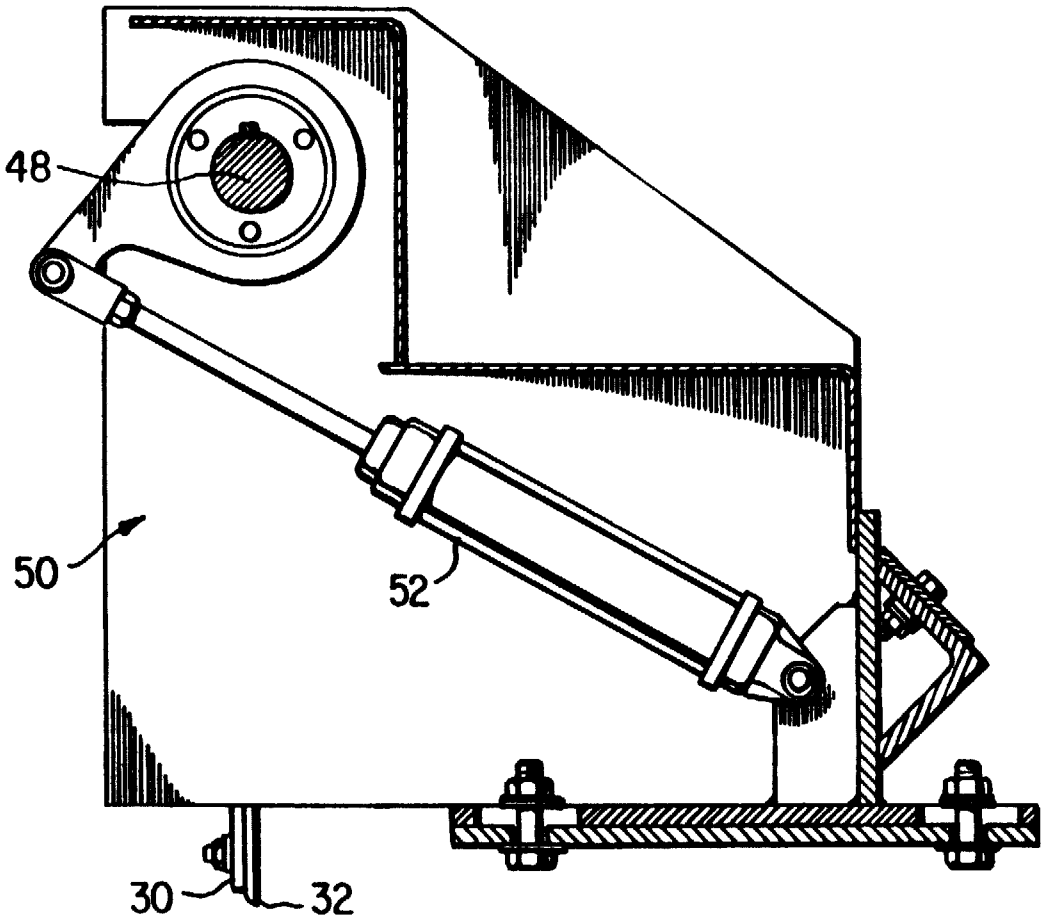
FIG. 6 is a cross-sectional view of the paper tail cutter of FIG. 5, taken with respect to line V—V of FIG. 5.

FIGS. 5 and 6 illustrate an alternate embodiment of the invention which differs from that shown in FIGS. 2, 3 and 4 only in respect of the arrangement for mounting and supporting body member 24. More particularly, body member 24 of the embodiment in FIGS. 5 and 6 is supported by axle 48 which is coupled at one end to frame 50, without the need for a support leg 27 as provided in the embodiment of FIGS. 2, 3 and 4. As may be seen in FIG. 6, air cylinder 52 which pivots body member 24 is recessed within frame 50. The embodiment of FIGS. 5 and 6 is somewhat more compact than that of FIGS. 2, 3 and 4 and may thus be used in more confined areas within the paper making machinery setup.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A paper tail cutter for [cutting and] deflecting a moving paper tail from *an edge of* a moving sheet of paper *and cutting said tail transversely*, said paper tail cutter comprising:

(a) a body member for supporting said moving paper tail, said body member pivotally mounted, at one end, so that the opposed end of said member may swing through the plane traversed by said moving paper sheet; [and,]

(b) a first knife at said opposed end[;] *extending transversely of said body member; and,*

(*c*) *a second knife fixed with respect to said first knife to provide a scissor-like cutting action between said knives when said body member pivots to swing said first knife across said second knife;* whereby pivotal movement of said body member and said first knife relative to said moving paper sheet [cuts a portion of said moving paper sheet to yield said moving paper tail and continued pivotal movement of said body member] deflects said moving paper tail away from said moving paper sheet *and cuts said tail transversely.*

[2. A paper tail cutter as defined in claim 1, further comprising a second knife fixed with respect to said first knife to provide a scissor-like cutting action between said knives when said body member pivots to swing said first knife across said second knife.]

3. A paper tail cutter as defined in claim [2] *1*, wherein said body member has a troughed surface for retaining and guiding said paper tail.

4. A paper tail cutter as defined in claim 3, further comprising powered means for pivoting said body member to force said first knife across said second knife.

5. A paper tail cutter as defined in claim 4, wherein, said knives have edges contoured to cut an end of said tail shaped to ease machine handling of said tail.

6. A paper tail cutter as defined in claim 5, wherein said knife edges are contoured to cut a "V"-shaped end of said tail.

7. A paper tail cutter as defined in claim 4, wherein said body member is normally retracted to a position [beneath] *to one side of the path of* said moving paper sheet, and wherein said second knife is fixed in position [above] *on the opposite side of said path of* said moving sheet, whereby operation of said powered means pivots said body member through *said path of* said sheet to deflect said tail away from said sheet.

8. A paper tail cutter as defined in claim 7 further comprising a "U"-shaped frame having a first leg for pivotally mounting said one end of said body member and having a second, opposed leg for supporting said second knife.

* * * * *